United States Patent [19]

Hazama

[11] Patent Number: 5,478,180
[45] Date of Patent: Dec. 26, 1995

[54] BROACHING MACHINE

[75] Inventor: Masanori Hazama, Ishikawa, Japan

[73] Assignee: Kabushiki Kaisha Komatsu Seisakusho, Tokyo, Japan

[21] Appl. No.: 211,456

[22] PCT Filed: Aug. 3, 1993

[86] PCT No.: PCT/JP93/01089

§ 371 Date: Apr. 1, 1994

§ 102(e) Date: Apr. 1, 1994

[87] PCT Pub. No.: WO94/03296

PCT Pub. Date: Feb. 17, 1994

[30] Foreign Application Priority Data

Aug. 4, 1992 [JP] Japan .................................. 4-207972
Jan. 22, 1993 [JP] Japan .................................. 5-008766

[51] Int. Cl.⁶ .................................................. B23D 41/00
[52] U.S. Cl. ............................................ 409/287; 82/106
[58] Field of Search .................................. 409/243, 244, 409/262, 268, 282, 287, 199, 203, 281, 282; 82/106; 29/601; 407/12

[56] References Cited

U.S. PATENT DOCUMENTS

| | | | |
|---|---|---|---|
| 4,242,020 | 12/1980 | Schmid | 82/106 |
| 4,494,281 | 1/1985 | Schmid | 29/6.01 |
| 5,030,049 | 7/1991 | Voss | 409/282 |

FOREIGN PATENT DOCUMENTS

| | | | |
|---|---|---|---|
| 379723 | 8/1990 | European Pat. Off. | 409/262 |
| 3901888 | 8/1990 | Germany . | |
| 89401 | 7/1981 | Japan | 82/106 |
| 60-167710 | 8/1985 | Japan . | |
| 2-145207 | 6/1990 | Japan | 409/287 |
| 243216 | 9/1990 | Japan | 409/287 |
| 4-5313 | 1/1992 | Japan . | |
| 4-35809 | 2/1992 | Japan | 409/243 |
| 1076217 | 2/1984 | U.S.S.R. | 409/287 |

*Primary Examiner*—William Briggs
*Attorney, Agent, or Firm*—Wenderoth, Lind & Ponack

[57] ABSTRACT

There is provided a broaching machine in which a first fitting portion to be fitted to a first end of the broaching shaft and a clamp for pressing the first fitting portion against the first end of the broaching shaft are provided at an end portion of the drive shaft, and a second fitting portion is formed at a front end portion of the support shaft so as to be fitted to the second end of the broaching shaft and is supported so as to be movable in an axial direction. A receptacle forming the second end of the broaching shaft is rotatable with respect to a main body of the broaching shaft. There is also provided a broaching machine in which a clamp bolt is threaded to the broaching tool body, an elongate hole is formed in a holder to which cutting segments of the broaching tool are mounted, and a press piece fitted to the clamp bolt is rotatable to engage the holder. Under this state, the holder is fixed to the broaching tool body by tightening the clamp bolt. A stopper member is provided for stopping the press piece at a rotary position at which the press piece is aligned with the elongate hole. When so aligned, the holder can be removed from the body of the broaching tool.

9 Claims, 14 Drawing Sheets

FIG. 15

BROACHING MACHINE

BACKGROUND OF THE INVENTION

This invention relates to a broaching machine utilized for carrying out a broaching operation.

In a conventional art, a broaching machine using a rotary-type broaching tool for carrying out a broaching operation is provided with a pair of opposing broaching units in which both ends of a broaching shaft disposed at a central portion of the broaching tool are supported by a drive shaft and a support shaft respectively provided for the paired broaching units, and one end of the broaching shaft and the drive shaft and the other end of the broaching shaft and the support shaft are coupled together, respectively, by means of bolts.

Because of this coupling, when it is required to exchange the broaching tool, it is necessary to entirely disassemble the broaching tool by removing the bolts or to disassemble the broaching tool from the broaching shaft with the broaching shaft remaining as it is, and thereafter, to exchange the removed broaching tool with a new one, thus requiring much time and labor for such an exchanging operation, thereby resulting in efficiency.

Furthermore, there is known a conventional machine in which a plurality of segments are fixed to an outer peripheral portion of a body of a broaching tool, for example, as disclosed in Japanese Utility Model Laid-open Publication No. HEI 4-5313 or Japanese Patent Laid-open Publication No. HEI 2-145207.

In the machine of the former publication, a press piece being rotatably fitted to a clamp bolt screwed with a broaching tool body and entirely penetrating an elongate hole of a segment is rotated by 90° to be engaged with the segment, and under this condition, the clamp bolt is tightened so that the segment is fixed to the broaching tool body.

On the other hand, the machine of the latter publication is provided with a holder to which a segment is fixed, and the segment is fixed to the broaching tool through the holder by rotating a T-bolt having a head penetrating an elongate hole of the holder and a shank screwed with the broaching tool body so that the head is engaged with the holder.

However, both the segment fixing machines of the above prior arts are not provided with any means for limiting the rotation of the press piece and the T-bolt at predetermined positions, so that, when the clamp bolt or T-bolt is loosened to remove the segment from the broaching tool, the position of the press piece or T-bolt is not determined, and hence, the segment is interfered with by the pressure piece or the head of the T-bolt, thus making it difficult to remove the segment, which also results in much time and labor for the exchanging of the tool, thereby resulting in poor efficiency.

Furthermore, in the former machine, a spring means interposed between the press piece and the broaching tool body is fitted to the clamp bolt, but in such structure, cut chips and the like are liable to adhere to the spring after the removal of the segment, so that the cut chips adhering to the spring intrude into a portion, for example, between the segment and the press piece, which may damage the segment, and there is a fear of deforming the bolt by a bending force applied to the bolt at the tightening time, whereby it becomes impossible to clamp the bolt with the sufficient torque.

SUMMARY OF THE INVENTION

This invention was conceived for overcoming such problems or inconveniences in the above conventional art and aims to provide a broaching machine capable of ensuring an easy and quick exchanging of the broaching tool and the segment and remarkably improving the working efficiency.

As one embodiment of this invention for achieving the above and other objects, there is provided a broaching machine in which a broaching shaft of a broaching tool is supported at its both ends between a drive shaft and a support shaft which of a pair of opposing broaching units, respectively, and which is characterized in that:

a first fitting portion to be fitted to one end of the broaching shaft and a clamp means for fixedly pressing the first fitting portion on one end of the broaching shaft are provided at a front end portion of the drive shaft;

a second fitting portion is formed at a front end portion of the support shaft so as to be fitted to another end of the broaching shaft and to be movable in an axial direction thereof, and the another end of the broaching shaft is made to be rotatable with respect to a body of the broaching shaft.

According to this structure, since the broaching shaft of the broaching tool can be automatically attached or detached to or from the drive shaft and the support shaft, the broaching tool exchanging operation can be done easily and quickly, thus remarkably improving the working efficiency in comparison with the prior art in which bolt fastening technique is utilized or only a cut tool is exchanged. Furthermore, according to this feature, the time for stopping the operation of the machine during the exchanging of the broaching tool can be largely reduced, thus improving the productivity.

In addition to the above structural feature, it is preferred that the first fitting portion be an angled protruding portion to be fitted to an angled recessed portion formed at an end surface of the one end of the broaching shaft, and the second fitting portion be a center boss to be fitted to a center boss receptacle provided at the another end of the broaching shaft.

Furthermore, it is also preferred that the clamp means comprise a clamp member fitted within the first fitting portion so as to be slidable in a direction normal to the axis thereof and a sliding member fitted to the first fitting portion so as to be axially slidable and connected to the clamp member through a flange portion arranged obliquely to the axial direction and a guide groove in which the flange portion is slidably fitted, and that the front end portion of the clamp member protrude from the surface of the first fitting portion so as to contact, under pressure, the one end of the broaching shaft.

Still furthermore, it is preferred that the support shaft be fixed to a support table mounted so as to be slidable in an axial direction of the broaching unit.

Still furthermore, in addition to the above structural features, it is preferred that a temporary pedestal for temporarily supporting the another end of the broaching shaft be fixed to the support table at a position below the second fitting portion of the support shaft and that a hook for engaging the another end of the broaching shaft at a time of retracting the support table be fixed to the support table at a position below the second fitting portion. According to such features, the broaching tool exchanging operation can be further easily and quickly done.

As another embodiment of this invention, there is provided a broaching machine in which a plurality of segments are detachably mounted to an outer peripheral surface of a broaching tool body through holders to which the segments are fixed, which is characterized in that:

a press piece fitted to a clamp bolt threaded the broaching tool body and penetrating entirely an elongate hole formed in each of the holders is rotated and engaged with the holder and, under this state, the holder is fixed to the broaching tool body by tightening the clamp bolt; and a stopper member is provided for the holder for stopping the press piece at a position at which the press piece aligns with the elongated hole.

According to this structure, the press piece and the elongate hole can be easily aligned by the stopper member, whereby the segment detaching operation can be easily done at the time of removing the segment with no engagement of the press piece.

In addition to the above structural features, it is preferred that a spring cylinder be fitted to the clamp bolt that a compression spring be accommodated in the spring cylinder so as to urge the press piece upward, and that a cylindrical projection, rotatably received in a circular recess formed in the holder concentrically with the elongate hole and adapted to close an upper opening of the spring cylinder, be formed on the lower surface of the press piece.

According to this structure, the compression spring is accommodated in the spring cylinder so as to urge the press piece to prevent it from rotating at the time of loosening the clamp bolt and the opening of the spring cylinder is closed by the projection of the press piece, so that cut chips or the like never adhere to the compression spring at the time of exchanging the segments.

Since the cut chips also do not adhere to the attaching surface, the segment exchanging operation can be easily done, and so that the segments can be surely fixed to the broaching tool body with sufficient torque.

Further, it may be possible to constitute a third embodiment by combining the above two embodiments.

BRIEF DESCRIPTION OF THE DRAWINGS

This invention will be more understood from the following detailed description of the invention and the accompanying drawings showing embodiments of this invention. Further, the embodiments represented by the drawings do not intend to limit the invention and are made merely for easy explanation and understanding.

In the accompanying drawings.

BEST MODE FOR CARRYING OUT THE INVENTION

A broaching machine according to one preferred embodiment of this invention will be described hereunder with reference to FIGS. 1 to 11.

Figure 1:
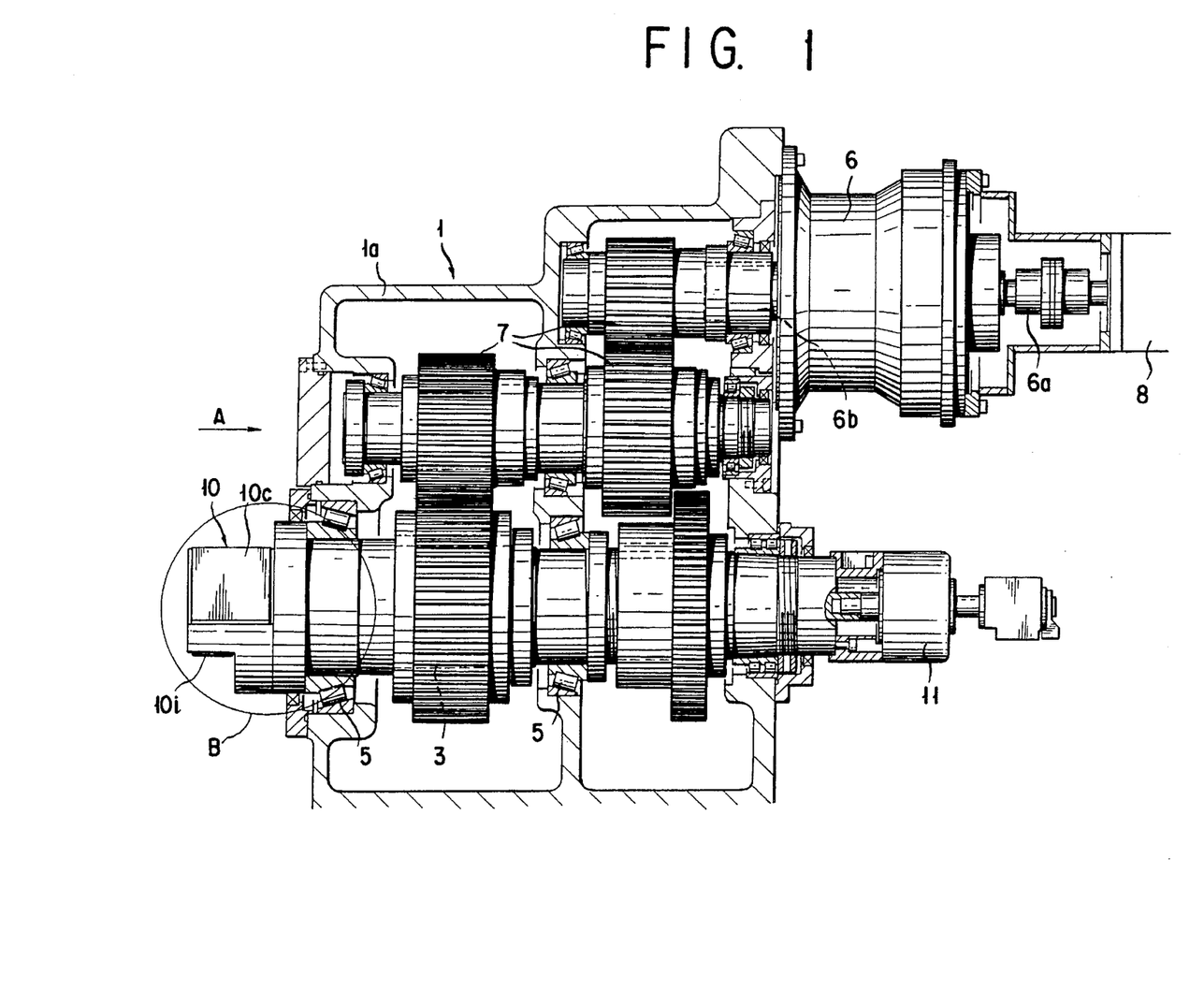
FIG. 1 is a partial sectional view of a broaching unit on a drive shaft side according to one embodiment of a broaching machine of this invention.
Figure 2:
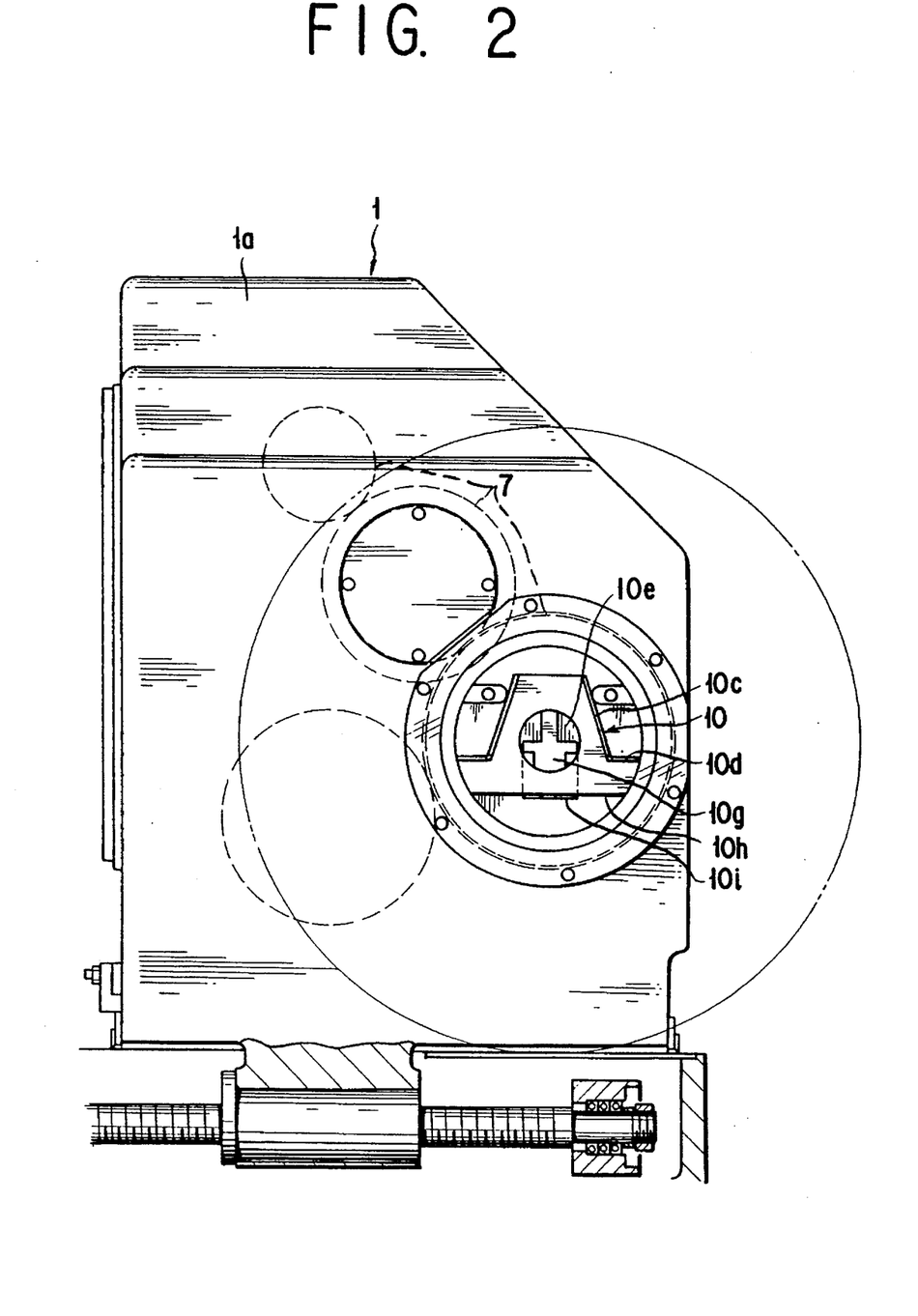
FIG. 2 is a front view as viewed from direction A in FIG. 1.
Figure 6:
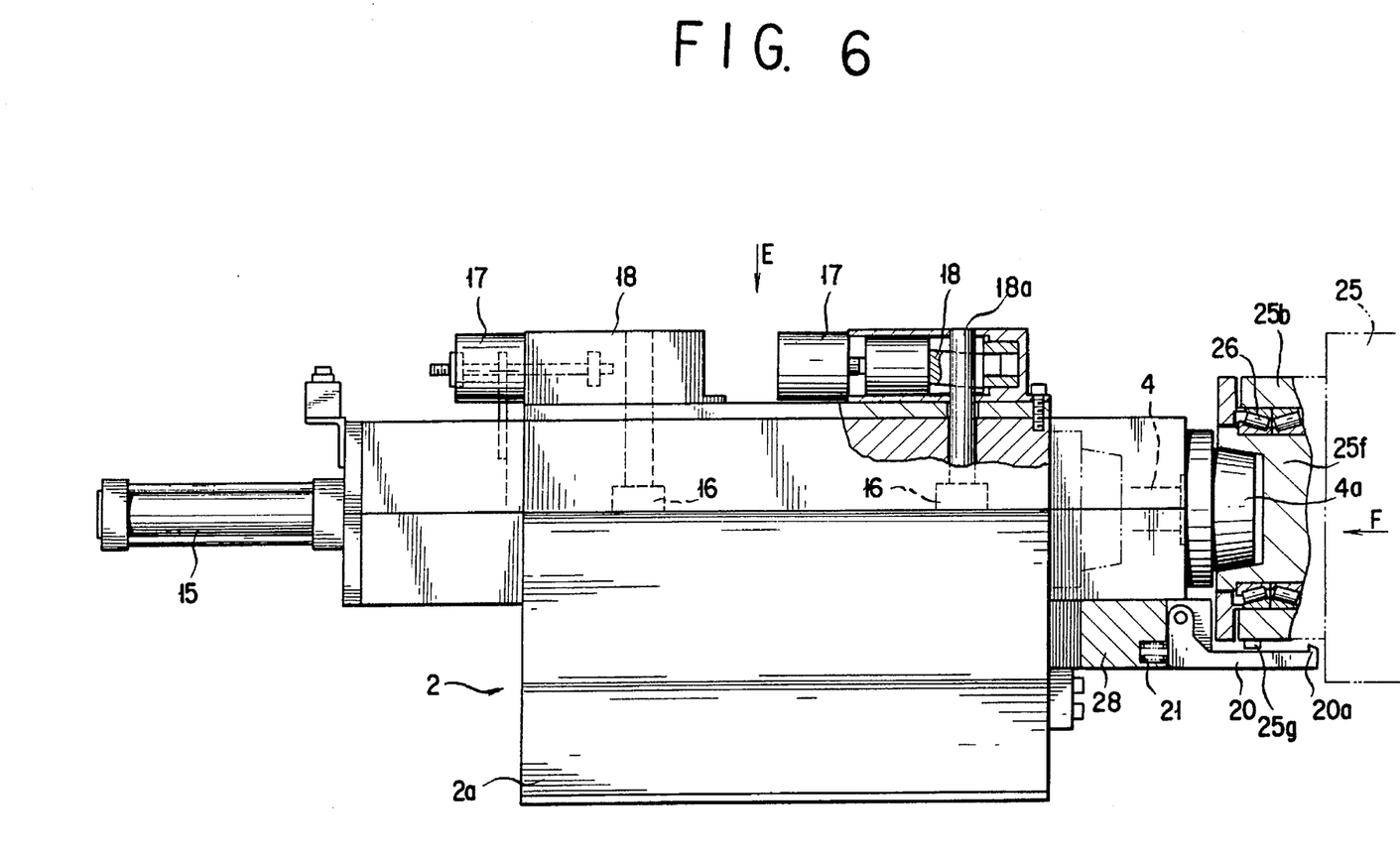
FIG. 6 is a front view, partially cut away, of a broaching unit on a support shaft side of the embodiment of FIG. 1.
Figure 7:
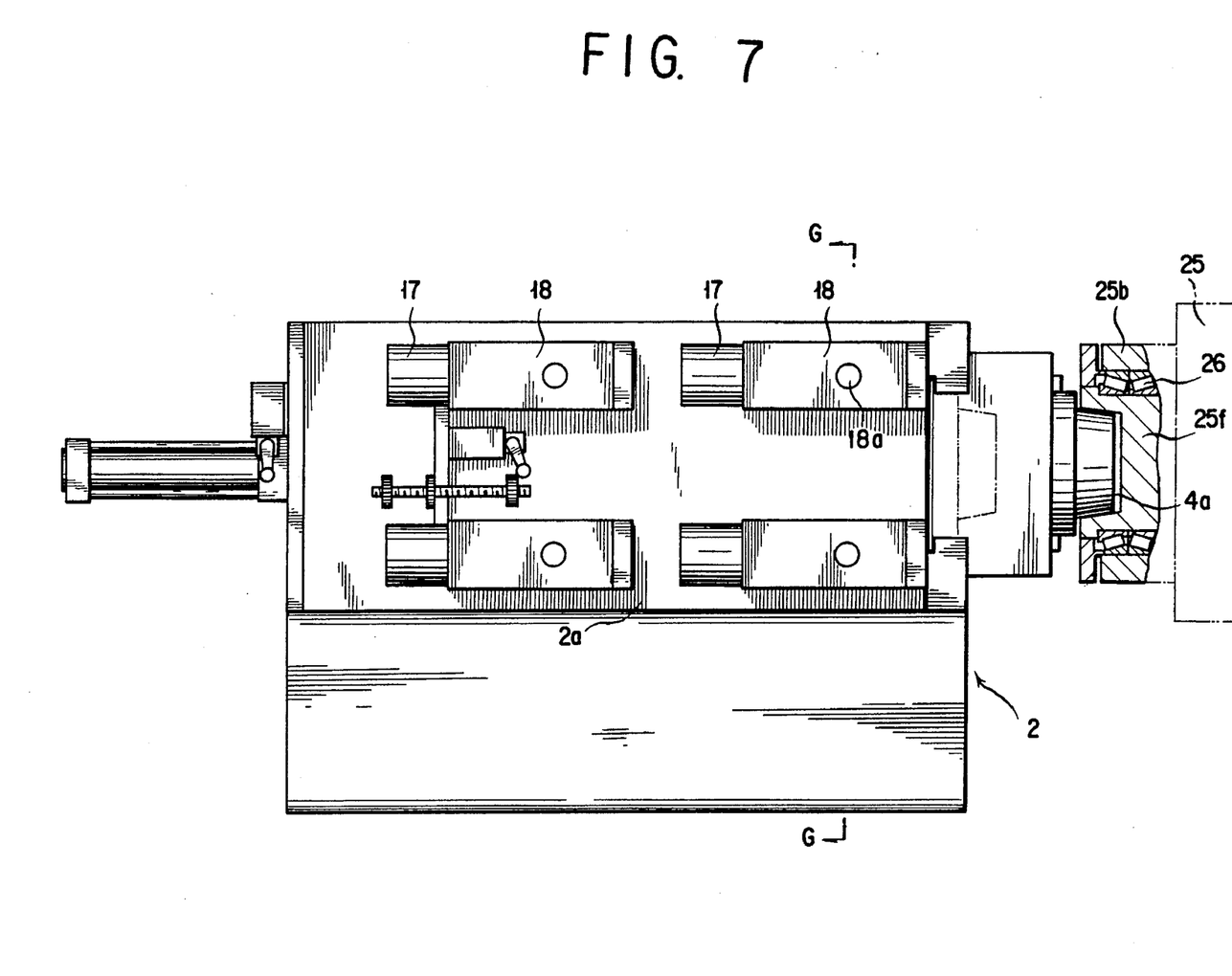
FIG. 7 is a plan view as viewed from direction E in FIG. 6.

Reference numerals 1 and 2 respectively shown in FIGS. 1 and 6 denote a pair of broaching units, and a drive shaft 3 is provided for broaching unit 1 and a support shaft 4 is provided for the other one broaching unit 2.

The drive shaft 3 of the broaching unit 1 is supported rotatably by a support case 1a through bearings 5. The drive shaft 3 and a power output shaft 6b of a speed reduction device 6 mounted to the support case 1a are coupled with each other through a gear train 7 accommodated in the support case 1a.

The speed reduction device 6 has a power input shaft 6b to which a broaching tool driving motor 8 composed of a servo-motor is connected, so that the drive shaft 3 is rotated by the broaching tool driving motor 8 through the speed reduction device 6 and the gear train 7.

A fitting portion 10 is provided at an end portion on the side opposing the support shaft 4 so as to be fitted to one end of a broaching shaft, described hereinafter, of the broaching unit, and a rotary cylinder 11 is provided on the opposing end portion of the broaching shaft.

Figure 4:
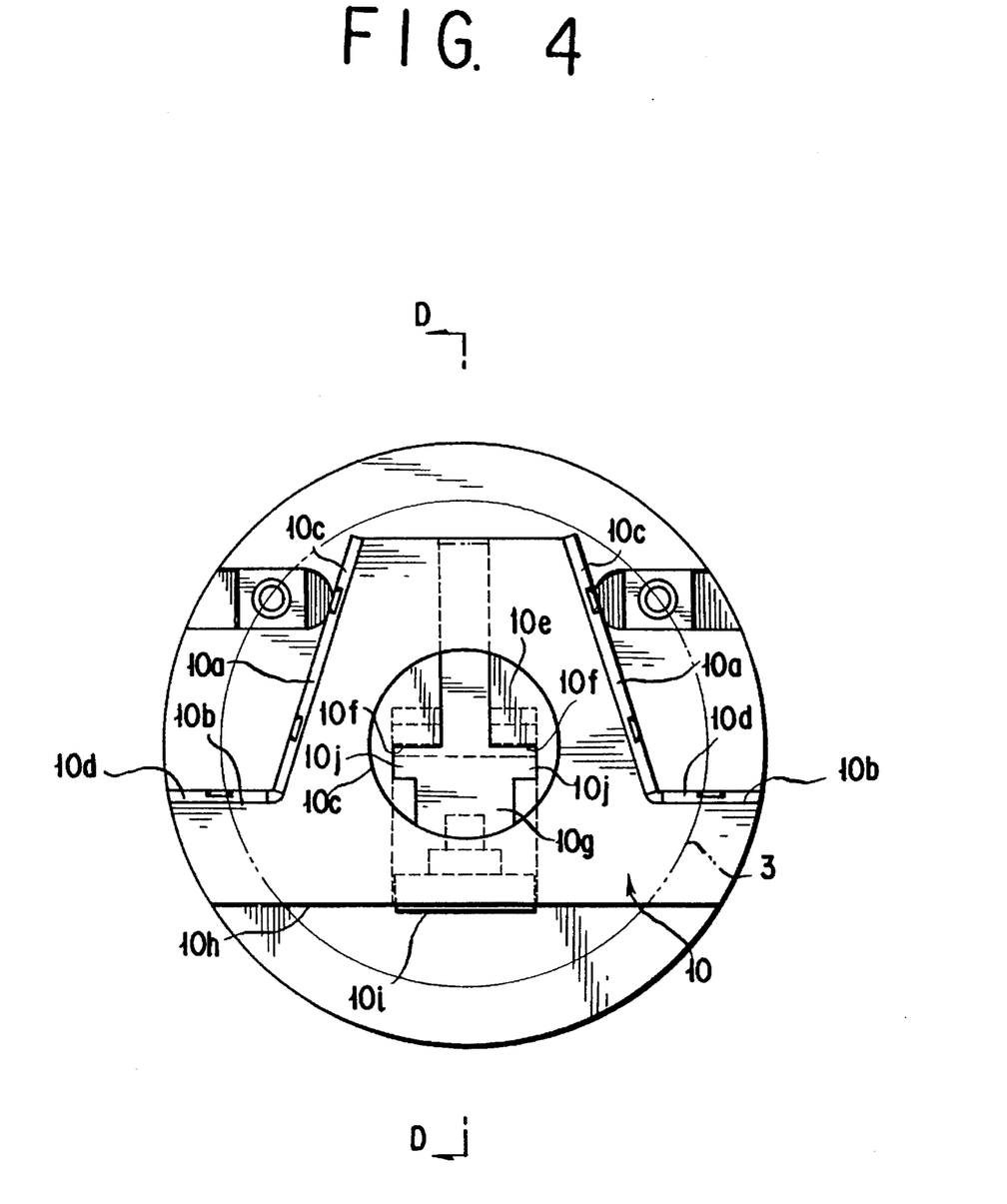
FIG. 4 is a front view as viewed from direction C in FIG. 3.

The fitting portion 10 has an angled shape, as best shown in FIG. 4, having two inclined surface portions 10a and two flat surface portions 10b continuous to the lower portions of the inclined surface portions 10a, and reference pads 10c and 10d are attached to the inclined surface portions 10a and the flat surface portions 10b. The fitting portion 10 has a central axial hole into which a sliding member 10e is inserted to be freely movable in the axial direction.

Figure 3:
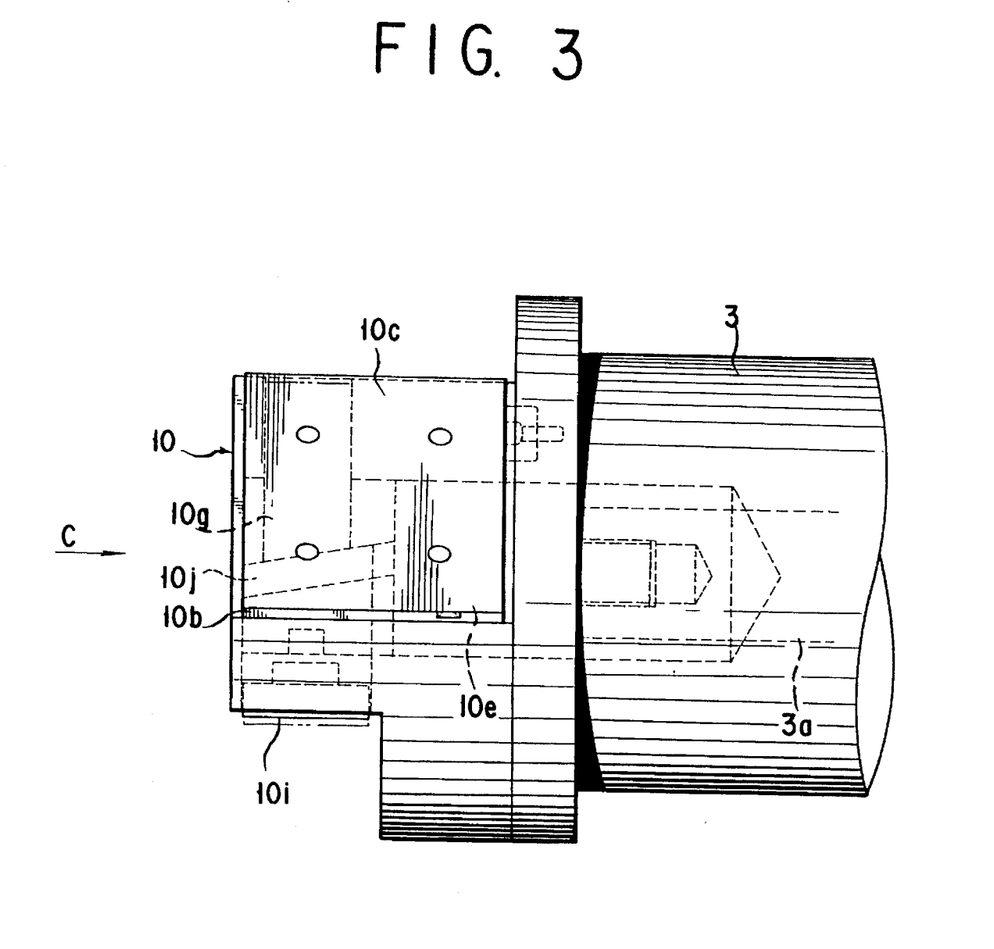
FIG. 3 is an enlarged view of a portion encircled by a letter B in FIG. 1.
Figure 5:
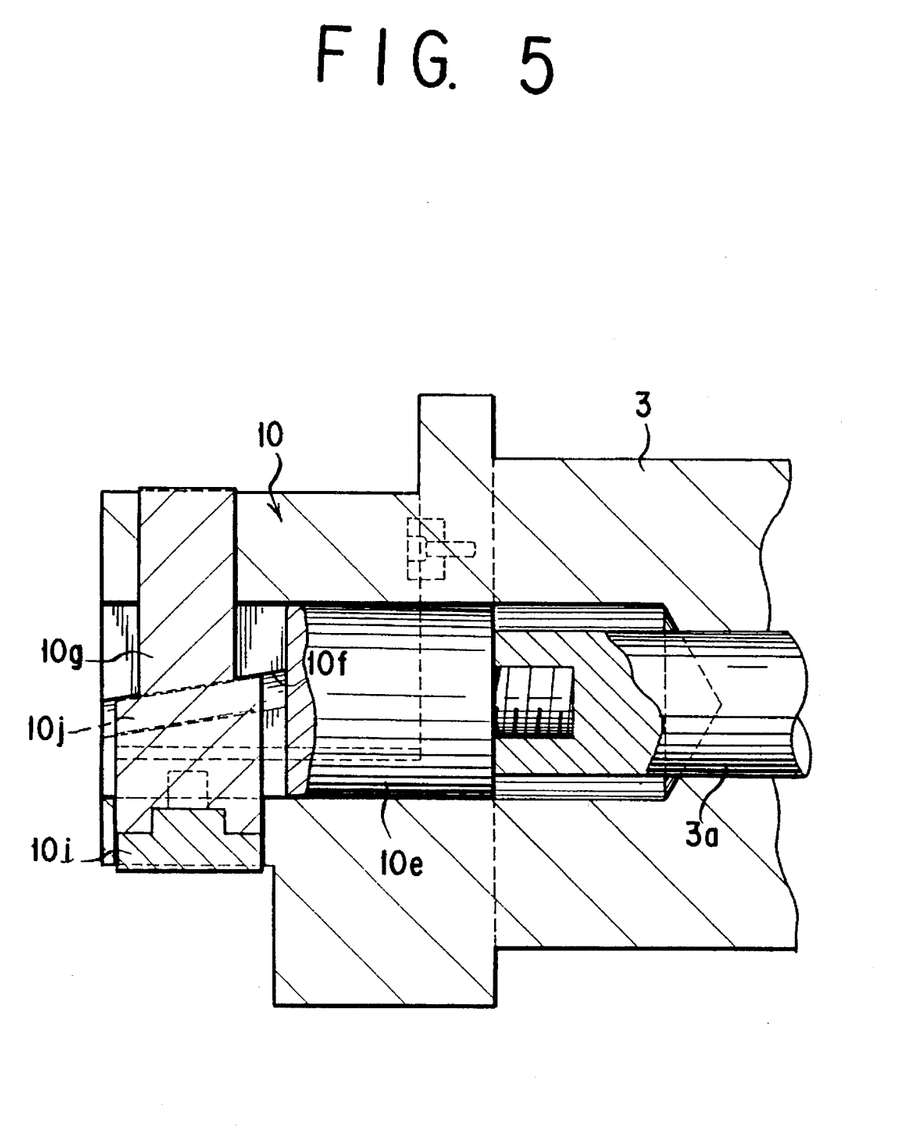
FIG. 5 is a sectional view taken along line D—D in FIG. 4.

The sliding member 10e has one end which is, as shown in FIGS. 3 and 5, connected to the rotary cylinder 11 through an operation rod 3a disposed at a central portion of the drive shaft 3 so that the drive shaft 3 is movable in the axial direction by the operation of the rotary cylinder 11. The sliding member 10e has another end in which a guide groove 10f is formed obliquely with respect to the axial direction so that a flange portion 10j formed on a side surface of a clamp member 10g and in the same direction as the guide groove 10f is slidably received within the guide groove 10f.

The clamp member 10g is fitted into a hole formed in the fitting portion 10 and extending in a direction normal to the axial direction and the clamp member 10g is slidable in the direction normal to the sliding member 10e. The clamp member 10g is slid by the cooperation of the guide groove 10f and the flange portion 10j in accordance with the movement of the sliding member 10e, and the front end of the clamp member 10g is capable of freely projecting from a bottom surface 10h parallel to the horizontal surface 10b. A clamp pad 10i is secured to this front end.

Figure 9:
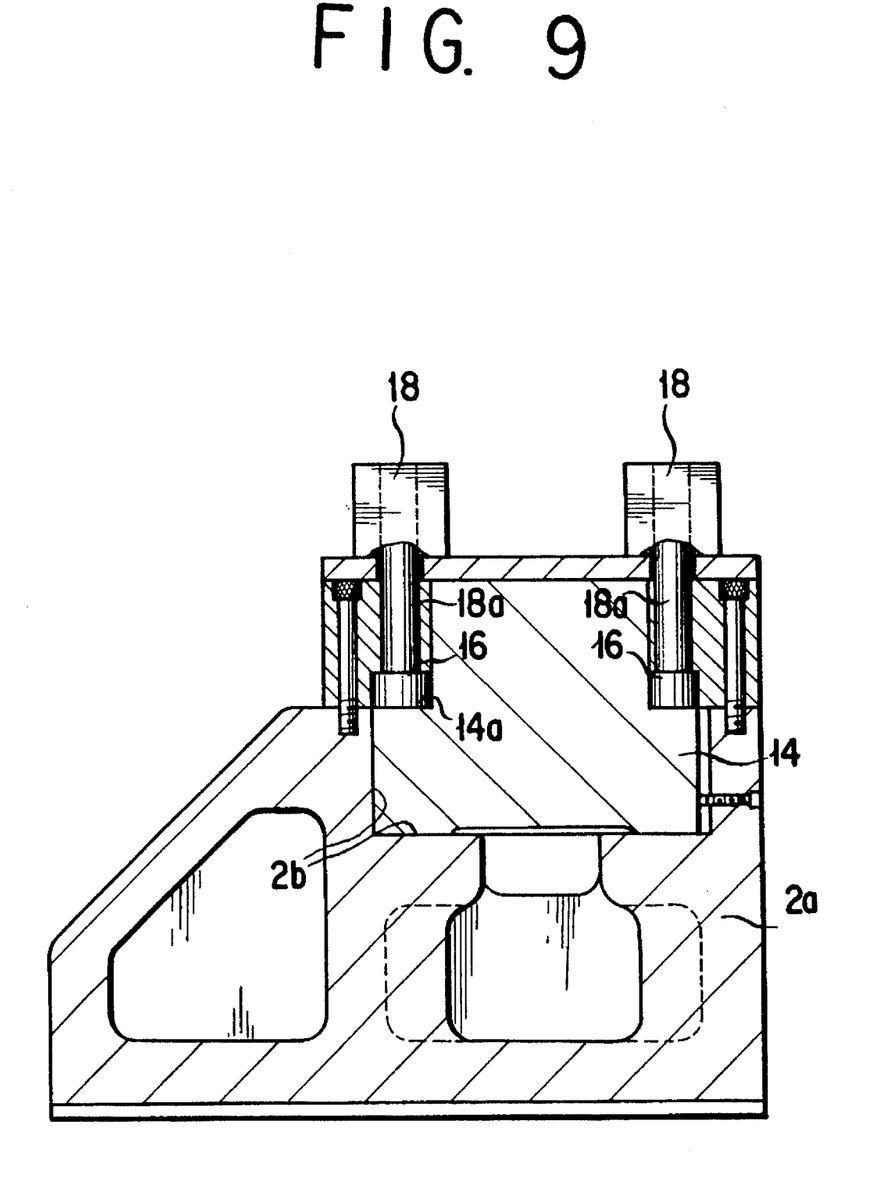
FIG. 9 is a sectional view taken along line G—G in FIG. 7.

On the other hand, with reference to the broaching unit 2 to which the support shaft 4 is provided, as shown in detail in FIG. 9, a support table 14 for supporting and fixing the support shaft 4 is disposed in the support case 2a to be movable in the axial direction. The support table 14 is arranged to be movable in the axial direction of the support shaft 4 by means of a slide cylinder 15.

The support table 14 contacts and is slidably relative to guide surfaces 2b of the support case 2a at the bottom and both side surfaces. The support table 14 has shoulder portions at which are formed stepped portions 14a having upper surfaces abutting against adjusting plates 16, respectively. The support table 14 can be guided and moved by the guide surfaces 2b and the adjusting plates 16. Above the adjusting plates 16 there are provided a plurality of clamp cylinders 17 and clamp mechanisms 18 each having a structure similar to that of the clamp mechanism of the fitting portion 10, and the clamp mechanisms 18 are operated by the clamp cylinders 17 so that the adjusting plates 16 are pressed downward by clamp members 18a of the clamp mechanisms 18 to thereby fix the support table 14 at the predetermined position.

Figure 8:
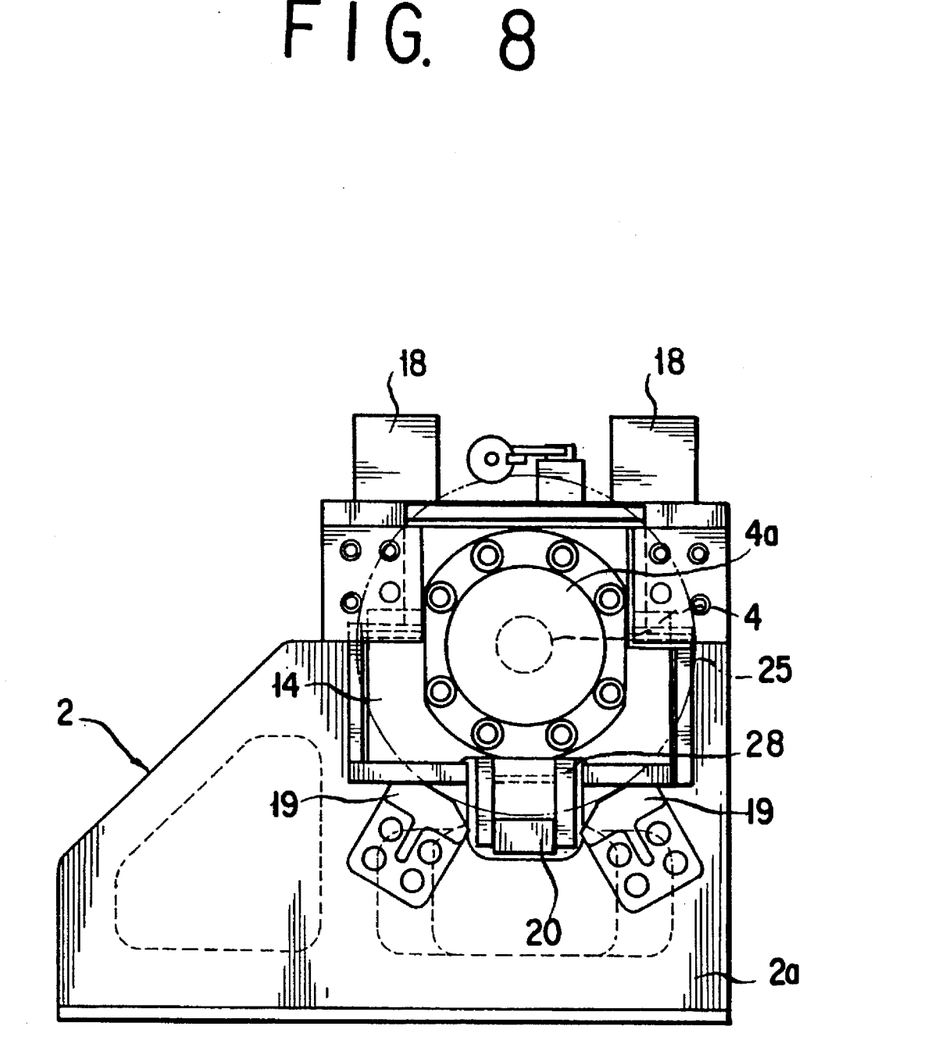
FIG. 8 is a side view as viewed from direction F in FIG. 6.

As shown in FIG. 6, a center boss 4a having a tapered surface is formed at the end, on the side of the drive shaft 3, of the support shaft 4 fixed to the support table 14, and a center boss receptacle 25f connected to one end of a broaching shaft 25b, described hereinafter, receives the boss 4a. Further, as best shown in FIG. 8, a holder 28 is provided for the support table 14 at a portion below the center boss 4a and a pair of temporary pedestals 19 are disposed on the support case 2a on both sides of the holder 28.

The holder 28 is secured to the front surface of the support table 14 and a base end of a hook 20 having an approximately L-shape is pivoted to the front end of the holder 28.

The hook 20 is formed with an engaging portion 20a to be engaged with a projection 25g projecting from an outer peripheral surface of an end portion of the broaching shaft 25b, and the hook 20 is urged by a compression spring 21 disposed inside the holder 28 so that the front end of the hook 20 is rotated in an upper direction.

Figure 10:
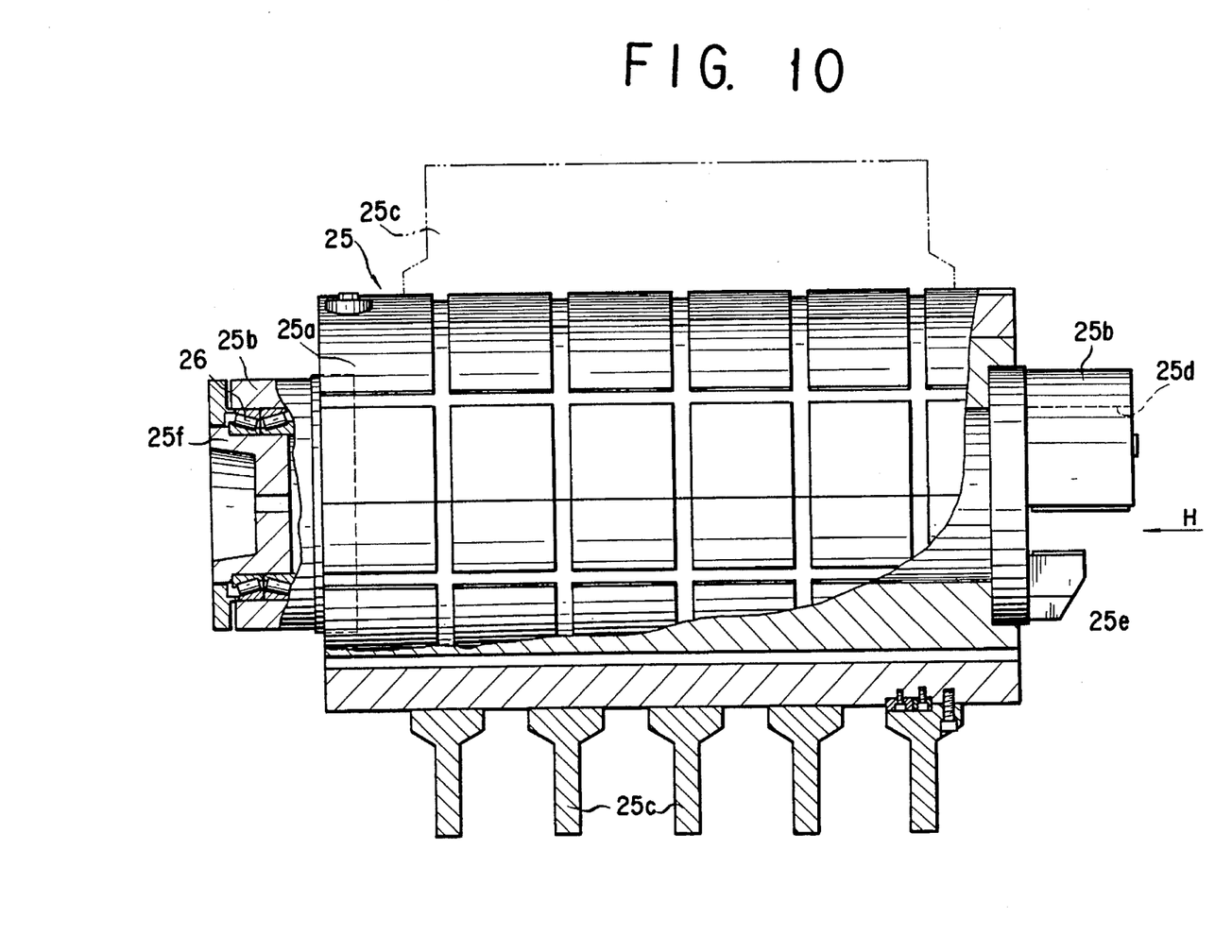
FIG. 10 is a front view, partially cut away, of a broaching tool of the above embodiment.

The broaching tool 25 is composed of, as shown in FIG. 10, a cylindrical broaching tool body 25a and a broaching shaft 25b disposed so as to penetrate the central portion of the tool body 25a, and a plurality of segments (cut tool) 25c are attached, in a plurality of rows, to the outer periphery of the broaching tool body 25a in the circumferential direction thereof as spaced apart from each other.

Figure 11:
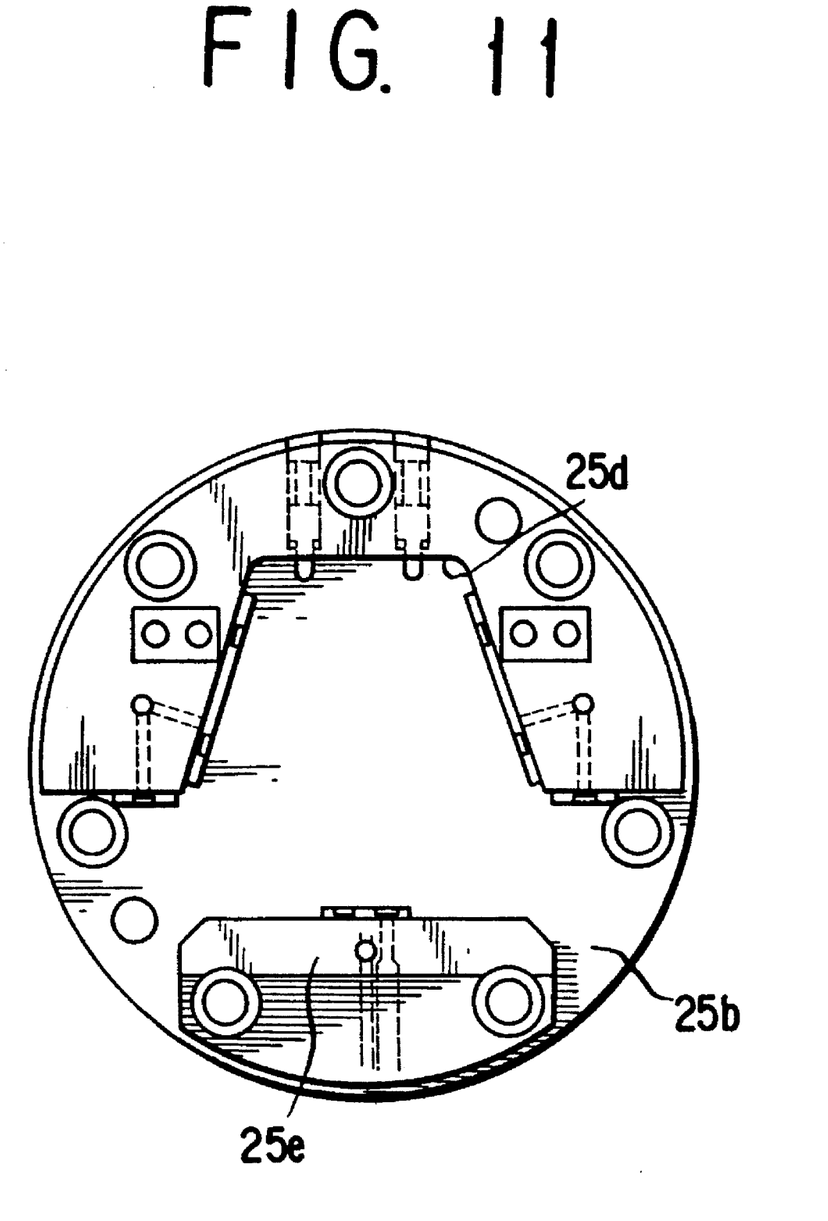
FIG. 11 is a side view as viewed from direction H in FIG. 10.

Further, as shown in FIG. 11, one end portion of the broaching shaft 25b forms an angled recess 25d configured to receive the fitting portion 10 of the drive shaft 3 and a carrier seat 25e against which the clamp pad 10i abuts at a portion below the recess 25d. The center boss receptacle 25f is rotatably supported by the other end portion of the broaching shaft 25b through a bearing 26.

The operation of the broaching machine of this invention will be described hereunder.

When the broaching tool 25 is mounted to the broaching machine, the broaching tool 25 is first conveyed between the respective broaching units 1 and 2 in a manner such that one end of the broaching shaft 25b is fitted to the fitting portion 10 of the drive shaft 3 from the upper portion thereof and the other end thereof is rested on the temporary pedestal 19 of the broaching unit 2.

Next, under this condition, the support table 14 is moved towards the broaching unit 1 side by the actuation of the slide cylinder 15 and the tapered center boss 4a provided on the front end of the support shaft 4 is then fitted in the center boss receptacle 25f formed at the end portion of the broaching shaft 25b, thus centering the broaching shaft 25b with respect to the support shaft 4.

Thereafter, the sliding member 10e is moved on the side opposing the broaching tool 25 by the actuation of the rotation cylinder 11 and the clamp member 10g is then moved in the direction normal to the axial line.

According to these operation, the clamp pad 10i attached to the clamp member 10g is press-fitted under force to the carrier seat 25e provided on the broaching shaft 25b, whereby the surface defining the angled recess 25d of the broaching shaft 25b abuts against the reference pads 10c and 10d of the fitting portion 10 to thereby carry out the centering operation with respect to the drive shaft 3. Further, since the broaching shaft 25b is fixed to that position by the press-fitting, the broaching shaft 25b is axially positioned.

As described above, after the broaching tool 25 has been mounted between the drive shaft 3 and the support shaft 4, the support table 14 is fixed by means of the clamp cylinder 17, and then, a work piece is worked by the segments (cut tool) 25c attached to the body of the broaching tool 25 by rotating the drive shaft 3 by the broaching tool rotating motor 8 while rotating the work piece supported by spindles, not shown. During this operation, as the support table 14 supporting the support shaft 4 is fixed to the support case 2a of the broaching unit 2, no vibration or the like is caused.

On the other hand, when it is required to exchange the broaching tool 25, a series of operations reverse to those mentioned above will be performed. In a case where the support table 14 is retracted by the operation of the slide cylinder 15, the hook 20 connected to the holder 28 is engaged with the projection 25g formed to the broaching shaft 25b and then the broaching tool 25 is moved to the support shaft 4 side, thus easily removing the broaching tool 25.

FIGS. 12 to 15 represent a broaching tool of another embodiment of this invention.

In these figures, reference numeral 31 denotes a body of the broaching tool, which has a polygonal, such as hexagonal, cylindrical shape, and a broaching shaft disposed at the central portion thereof is supported by and between the drive shaft and the support shaft of a pair of opposing broaching units, respectively, so as to be rotatable.

Figure 12:
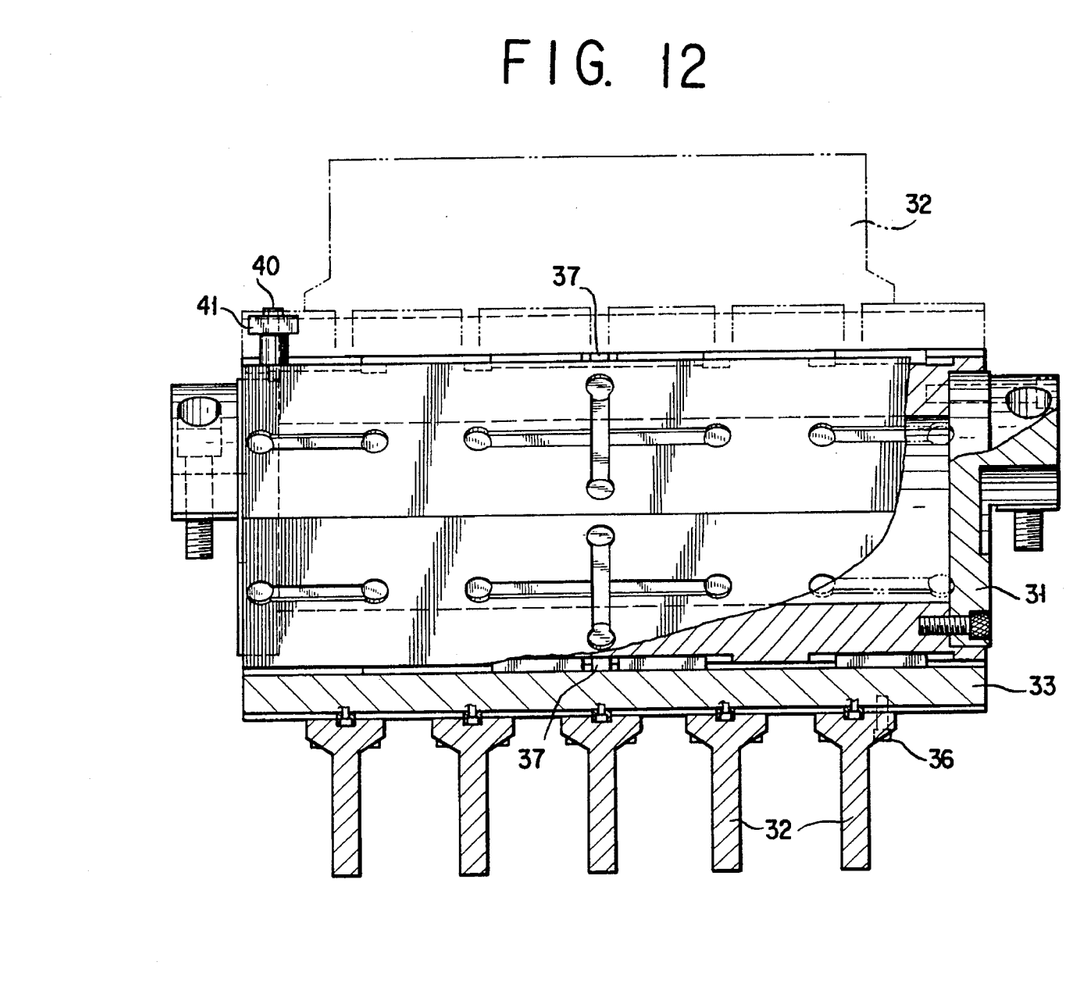
FIG. 12 is a front view, partially cut away, of a broaching tool of another embodiment of this invention.
Figure 13:
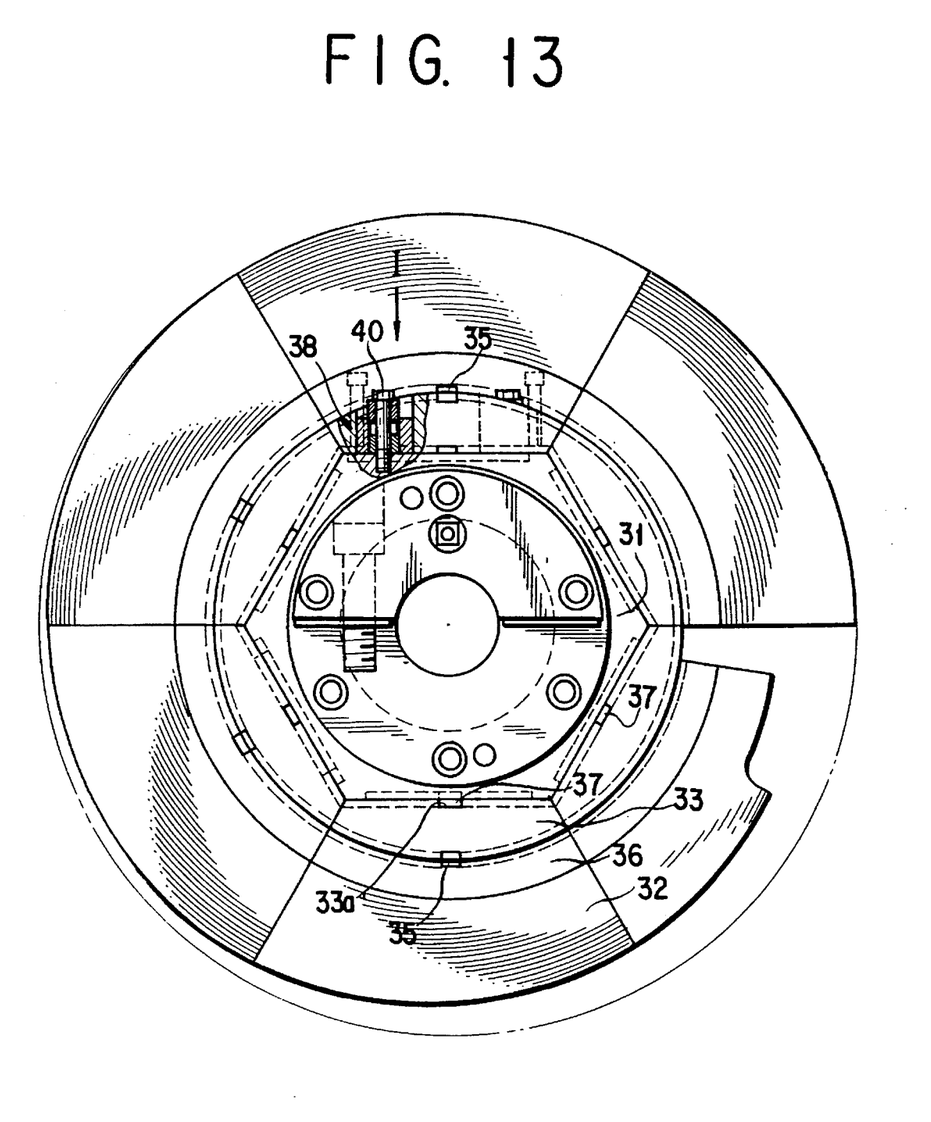
FIG. 13 is a side view of a broaching tool of the another embodiment.

Reference numeral 32 denotes, as shown in circumferential direction, and these segments 32 are mounted to the outer surfaces of the broaching tool 31 respectively through holders 33 to which the segments are secured. The segments 32 have outer peripheral surfaces to which chips, not shown, are mounted, respectively.

Each of the holders 33 has a cylindrical outer peripheral surface and a flat surface contacting the broaching tool body 31. The inner peripheral surface of the segment 32 positioned in the rotational direction by means of a key 35 is fixed to the cylindrical outer peripheral surface by means of set bolt 36. Further, a key groove 33a is formed in the flat surface of the holder 33 and the key groove 33a receives a key 37 disposed on the side of the broaching tool 31, thereby positioning the broaching tool body 31 with respect to the axial direction thereof.

The holders 33 are fixed to the broaching tool body 31 by fixing devices 38. Each of the fixing devices 38 has a structure shown in FIGS. 14 and 15. That is, an elongate hole 33b having a rectangular shape is formed in the holder 33 and a shank portion of a clamp blt 40 is threaded to the broaching tool body 31 by penetrating this elongate hole 33b.

Figure 15:
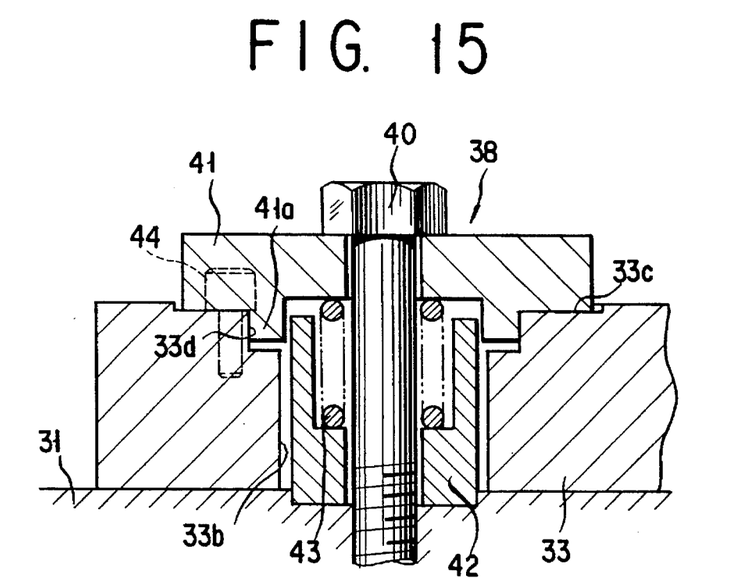
FIG. 15 is a sectional view taken along the line J—J in FIG. 13.

A press piece 41 is fitted to a neck portion of each clamp bolt 40, and a spring cylinder 42 disposed in the elongate hole 33b and accommodating a compression spring 43 is fitted to a shank portion of the clamp bolt 40.

Figure 14:
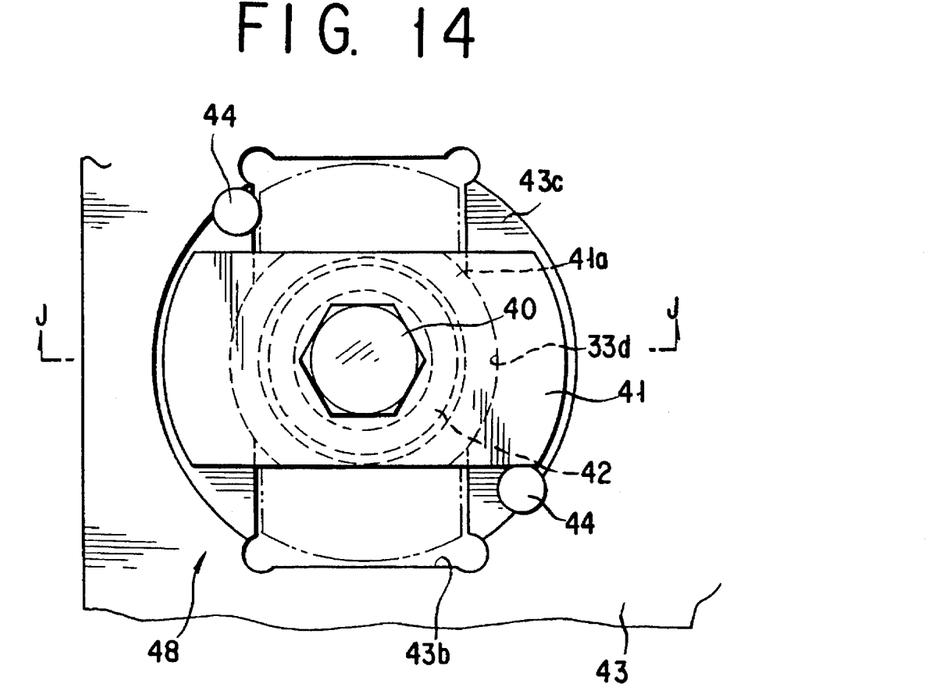
FIG. 14 is an enlarged plan view as viewed from direction I in FIG. 13.

The press piece 41 has a rectangular shape suitable for penetrating the elongate hole 33b and both ends thereof form arcs with the clamp bolt 40 being the center thereof so that the pressure piece 41 is rotatable in a circular stepped portion 33c formed in a portion of the holder 33 in the vicinity of the opening of the elongate hole 33b.

Further, a cylindrical projection 41a, which is engaged with holder 33 to be rotatable within a circular recess 33d formed concentrically with the elongate hole 33b, is formed at the lower surface of the press piece 41 so as to close the upper opening of the spring cylinder 42.

The upper end portion of the spring cylinder 42 is fitted into the cylindrical projection 41a from the lower side thereof and the compression spring 43 accommodated in the spring cylinder 42 upwardly urges the press piece 41.

Reference numeral 44 denotes a pair of stopper members for limiting the rotating range of the press pieces 41, which act to stop the press pieces 41 at positions corresponding to the elongate holes 33b, i.e. the engagement releasing positions, and at engaging positions at which the pressure pieces 41 engage the holders 33.

The operation of this embodiment will be described hereunder.

When the segments 32 are to be removed from the broaching tool body 31, the clamp bolts 40 of the fixing devices 38 fixing the holders 33 to the broaching tool body 31 are first loosened, and under this condition, the press pieces 41 are rotated from positions shown by a solid line in FIG. 14 to positions shown by a chain line.

At this time, since each of the press pieces 41 is stopped at the engagement releasing position, i.e. after having been rotated by about 90°, by the stopper member 44 the press piece 41 and the elongate hole 33b are precisely aligned, whereby the pressure piece 41 can easily penetrate the elongate hole 33b.

Then, since the pressure piece 41 is urged upward by the compression spring 43, the position thereof is not changed at a time of removing the segment 32, and accordingly, the segments 32 can be easily removed from the broaching tool body 31.

According to the manner described above, after the removal of all the segments 32 from the broaching tool body 31, segments utilized for the next operation are mounted to the broaching tool body 31 in a manner reverse to that described above, and the segment exchanging operation can be completed by then tightening the clamp bolts 40. During this segment exchanging operation, since the cylindrical projection 41a of the press piece 41 closes the opening of the spring cylinder 42 accommodating the compression spring 43, the intrusion of the cut chips or the like into the spring cylinder 42 and the adhesion thereof to the compression spring 43 can be prevented.

Further, it is to be noted that the above-mentioned two embodiments may be combined as a third embodiment.

Furthermore, this invention is described above with reference to the illustrated two embodiments, but it is to be understood by persons skilled in this art that various changes, eliminations and additions may be possible with respect to the embodiments without departing from the gist and scope of this invention, which scope is defined by the appended claims.

I claim:

1. A broaching machine for carrying out a broaching operation, comprising:

a broaching tool including a broaching shaft having first and second ends, the broaching shaft comprising a main body, and a receptacle at the second end of the shaft, said receptacle being supported so as to be rotatable relative to said main body;

a pair of opposing broaching units;

one of the paired broaching units including a drive shaft;

the other one of the broaching units including a support shaft, the broaching shaft of the broaching tool being supported at the first and second ends thereof between the drive shaft and the support shaft;

one end of the drive shaft having a first fitting portion adapted to be fitted to said first end of the broaching shaft;

said one of the broaching units also including clamp means for pressing the first fitting portion against said first end of the broaching shaft to fix the drive shaft to the broaching shaft; and one end of the support shaft having a second fitting portion adapted to be fitted to the receptacle at said second end of the broaching shaft so that the main body of the broaching shaft will rotate with respect to said receptacle when the broaching shaft is driven, said second fitting portion being supported in said other of the broaching units so as to be slidable in the axial direction of said broaching shaft.

2. A broaching machine according to claim 1, wherein the first fitting portion is an angular protrusion, said first end of the broaching shaft has an end surface which defines an angular recess that is configured to receive said protrusion, and the second fitting portion is a center boss configured to be fitted to said receptacle at the second end of the broaching shaft.

3. A broaching machine according to claim 1, wherein the clamp means comprises a clamp member supported within the first fitting portion so as to be slidable in a direction normal to the axis of said drive shaft, and a sliding member supported by the first fitting portion so as to be slidable in an axial direction, said clamp member and said sliding member defining a flange oriented obliquely to the axial direction and a guide groove in which the flange is received so as to be slidable, and wherein the clamp member has a front end that protrudes from the first fitting portion so as to contact, under pressure, said first end of the broaching shaft.

4. A broaching machine according to claim 1, wherein said other one of the broaching units includes a support table mounted to be slidable in the axial direction of the support shaft, said support shaft being fixed to said support table.

5. A broaching machine according to claim 4, wherein said other one of the broaching units includes a temporary pedestal for temporarily supporting the second end of the broaching shaft, said temporary pedestal being fixed to the support table at a position below the second fitting portion of the support shaft.

6. A broaching machine according to claim 4, wherein said other one of the broaching units includes a hook for engaging the second end of the broaching shaft while the support table is retracted in the axial direction of the support shaft away from the broaching tool, said hook being fixed to the support table at a position below the second fitting portion.

7. A broaching machine for carrying out a broaching operation, comprising:

a pair of opposing broaching units;

one of the paired broaching units including a drive shaft;

the other one of the broaching units including a support shaft; and a broaching tool including a broaching shaft having ends supported by said drive shaft and said support shaft, respectively, such that the broaching tool is rotatable, a body supported by said broaching shaft, a plurality of holders mounted to an outer periphery of said body of the broaching tool, said holders having elongate holes, a plurality of segments detachably mounted to an outer periphery of said body of the broaching tool through the holders, and fixing means for fixing the holders to said body of the broaching tool, the fixing means including clamp members, press pieces sized to fit entirely through the elongate holes formed in the holders when aligned with the holes, said press pieces being supported by the clamp members so as to be rotatable between first positions at which the press pieces are engaged with the holders and second positions at which the press pieces are aligned with said elongate holes, respectively, and stopper members limiting the press pieces from rotating from said first positions beyond said second positions at which the press pieces are aligned with the elongate holes, respectively.

8. A broaching machine according to claim 7, wherein said clamp members each include a clamp bolt, and said fixing means further included a spring cylinder fitted to the clamp bolt and a compression spring accommodated in the spring cylinder and urging the press piece upward, and wherein each of said holder includes a circular recess concentric with the elongate hole thereof, and each of said press pieces includes a cylindrical projection extending into said circular recess and closing an upper end of the spring cylinder.

9. A broaching machine for carrying out a broaching operation, comprising:

a broaching tool including a broaching shaft having first and second ends, the broaching shaft comprising a main body, and a receptacle at the second end of the shaft, said receptacle being supported so as to be rotatable relative to said main body;

a pair of opposing broaching units;

one of the paired broaching units including a drive shaft;

the other one of the broaching units including a support shaft, the broaching shaft of the broaching tool being supported at the first and second ends thereof between the drive shaft and the support shaft;

one end of the drive shaft having a first fitting portion adapted to be fitted to said first end of the broaching shaft;

said one of the broaching units also including clamp means for pressing the first fitting portion against said first end of the broaching shaft to fix the drive shaft to the broaching shaft; and one end of the support shaft having a second fitting portion adapted to be fitted to the receptacle at said second end of the broaching shaft so that the main body of the broaching shaft will rotate with respect to said receptacle when the broaching shaft is driven, said second fitting portion supported in said other of the broaching units so as to be slidable in the axial direction of said broaching shaft; and said broaching tool also including a body supported by said broaching shaft, a plurality of holders mounted to an outer periphery of said body of the broaching tool, said holders having elongate holes, a plurality of segments detachably mounted to an outer periphery of said body of the broaching tool through the holders, and fixing means for fixing the holders to said body of the broaching tool, the fixing means including clamp members press pieces sized to fit entirely through the elongate holes formed in the holders when aligned with the holes, said press pieces being supported by the clamp members so as to be rotatable between first positions at which the press pieces are engaged with the holders and second positions at which the press pieces are aligned with said elongate holes, respectively, and stopper members limiting the press pieces from rotating from said first positions beyond said second positions at which the press pieces are aligned with the elongate holes, respectively.

* * * * *